Patented Aug. 24, 1943

2,327,517

UNITED STATES PATENT OFFICE

2,327,517

PROCESS FOR CHLORINATION OF HIGH MOLECULAR WEIGHT HYDROCARBONS

Per K. Frolich, Westfield, and Lewis A. Bannon, Roselle, N. J., assignors, by mesne assignments, to Jasco, Incorporated, a corporation of Louisiana No Drawing. Application March 14, 1940, Serial No. 323,895

8 Claims. (Cl. 260—94)

This invention relates to chlorinated polymeric materials, and relates particularly to high molecular weight, substantially saturated, heat and storage resistant, long-chain chlorinated olefinic polymers such as those of isobutylene, and to methods for chlorinating them to a desired extent with the formation of products of high heat resistance and white color in the presence of metallic impurities.

Polyisobutylene has been prepared by the low temperature polymerization of isobutylene with boron trifluoride as a catalyst to form polymers having molecular weights ranging from about 1,000 to 350,000 or more. These polymers are very inert chemically, and are resistant to most chemical re-agents. An exception, however, is found in the halogens particularly chlorine. Polyisobutylene combines relatively readily with chlorine, the chlorine being substituted for hydrogen in the polymer molecule, and the chlorine may be incorporated into the polymeric substance almost to saturation, the theoretical limit being approximately 85.7%, and the practical limit being between 72% and about 80%. The reaction is preferably conducted upon the polymer in solution, as in carbontetrachloride, or other inert solvent, and it has been found possible to chlorinate the polymer while in a glass container in the presence of sunlight or ultraviolet light to yield a polymer having substantially any desired average percentage of chlorine up to the limiting maximum; and if the polymer itself is made in glass containers, or is substantially entirely free from metallic impurities such as iron and aluminum, the chlorinated product is white and stable to both heat and storage. Commercial production of the polymer in glass reaction vessels is, however, inconvenient and the reaction proceeds equally well in iron reactors. Also the washing and other treating operations applied to the polymer after it is removed from the reactor are preferably conducted in metal equipment. In consequence, traces of iron and other metals, depending upon the material of which the equipment is made, enter the polymer. Such traces of metals are harmless for most uses of the polymer, but in the chlorination reaction they are converted to the metal chlorides, which are powerful breakdown catalysts.

During the chlorination reaction, they cause a serious breakdown of the molecular weight of the polymer, producing an unduly low molecular weight chlorinated polymer, and the breakdown effect continues after the chlorinated polymer is separated from the solution, to produce dark colored substances, of relatively low molecular weight. This occurs upon simple storage at room temperature, and occurs very rapidly during heating of the polymer whereas, the metal-free chlorinated polymer is highly resistant to both storage and heat.

The present invention provides a new polymer composition, and an addition agent to the polymer or a stabilizer which avoids the destructive effects of the presence of traces of metallic impurities, and produces, upon chlorination, thermoplastic relatively high molecular weight chlorinated polymers which are white or light in color, do not darken on standing, and are resistant to heating. The polymer as prepared for the chlorination reaction thus has, added thereto, one or more protective substances which are, in general, organic substances of the type of carboxylic acids of which representative examples are acetic, propionic oxalic and stearic acids; or are amino derivatives of the carboxylic acids as represented by such substances as amino acetic acid, amino propionic acid; or are chloro derivatives of carboxylic acid such as monochloracetic acid, dichloracetic acid, trichloracetic acid, alphachlorpropionic acid, etc.; and the primary, secondary, and tertiary amines containing aryl, alkyl and hydroxy alkyl groups.

It has further been found that a much more uniformly chlorinated polymer can be obtained by treating the polymer under controlled conditions of temperature and pressure in the dark, and under such conditions a uniform chlorination of all of the molecules is readily obtainable since each molecule chlorinates to the extent determined by the specific conditions of temperature and pressure, and then the chlorination ceases. The resulting product also is white and thermally stable if the raw material is free from iron, aluminum and zinc.

The present invention is also applicable to this process for the chlorination reaction, the protective substances being similarly efficacious in protective effect during chlorination in the dark, under heat and pressure.

Thus an object of the invention is to chlorinate a linear polymer to a predetermined chlorine percentage with the formation of a thermoplastic product of white color and good thermal stability in spite of the presence of metallic impurities; and to protect the color and thermal stability of a chlorinated olefinic polymer; and to protect the color and stability against metallic impurities by chlorination in the presence of discoloration preventors and heat stabilizers. Other objects and details of the invention will be apparent from the following description:

In practicing the invention, the desired polymer is produced by polymerization of isobutylene at low temperatures such as from −10° C. to −150° C. in the presence of refrigerant-diluent substances such as liquefied ethylene, liquefied propane, solid carbon dioxide and in the presence of modifying substances such as diolefines of the type of butadiene, by the use of Friedel-Crafts type catalysts such as boron trifluoride, aluminum chloride, titanium tetrachloride, uranium chloride, etc. The polymerization reaction is desirably quenched at low temperature to avoid the production of undesirable low molecular weight materials; and to remove the catalyst; by the addition of substances such as alcohols, ethers, aldehydes and similar substances which are reactive with the catalysts. The polymer is then desirably washed to remove as much as possible of any traces of catalyst and as much as possible of the iron from the reaction and treating apparatus.

The polymer is then preferably dissolved in a suitable solvent such as carbon tetrachloride, hexachlorethane, difluor-dichlormethane, and similar solvents which are inert to chlorine, preferably to the formation of a 5% to 10% solution depending on the molecular weight of the polymer used, although both weaker and stronger solutions are usable. The solution is then prepared for the chlorination reaction.

The desired amount of the stabilizer or discoloration preventor is then added to the polymer solution. This preventor may take the form of amino acetic acid in the proportion of 0.05% to 5.0%; or may be acetic acid which may be added in amounts varying over a similar range; or may be an amine such as diamyl amine or other similar amine, in similar proportions. The other substances listed above as preventors may similarly be added either singly or in mixtures to the solution of the polymer in similar proportions as above indicated.

The solution is then placed in the chlorination reactor which may desirably be a glass lined, or nickel lined, chamber. The solution is brought to the desired temperature and chlorine added under the desired pressure which has been found to give the desired percentage content of chlorine in the product. The chlorine is introduced continuously, preferably by bubbling in at the bottom of the container, and is held at the desired pressure, which with the pre-set temperature, gives the desired percentage chlorination. The hydrochloric acid formed by the reaction is simultaneously released from the reactor. When chlorine ceases to be absorbed at the temperature and pressure used, showing that the chlorination reaction has reached the desired stage, the reaction is discontinued by shutting off the chlorine, and the pressure is released and the solution cooled.

The solvent may be removed from the chlorinated polymer in several different ways. A convenient procedure is by precipitation with alcohol. For this purpose, varying amounts of precipitant liquid such as alcohol or ether or ketone or other oxygenated liquids may be added to the solution of chlorinated polymer in a proportion of from 10% to 100% of the original bulk of solution. The precipitated polymer may then be filtered out or decanted or otherwise separated, and the residual solvent may be fractionally distilled to separate the respective components. Alternatively, the solution may be treated with substantial quantities of boiling water or steam which serve to drive off the solvent, leaving behind the chlorinated polymer. As between the two processes, it may be noted that the treatment with boiling water retains in the chlorinated polymer all of the original polymer without regard to the molecular weight, and all of the chlorinated material, without regard to the molecular weight, whereas precipitation by minimum amounts of oxygenated solvent may be utilized for a fractional separation between different molecular weights, the higher molecular weight portions being the first to precipitate. The final traces of solvent or water are desirably removed by drying in a hot air oven at a temperature of approximately 60° C. to 100° C. in a current of hot air.

The resulting polymer is highly resistant to heat, and retains the clear white color of the pure chlorinated polymer in the presence of traces of iron salts which otherwise would produce a serious discoloration and easy breakdown.

The characteristics of the resulting polymer are well shown by the following table which shows the characteristics of the chlorinated polymer both with and without the protective substances.

| Vistanex polybutene | Compound added | Percent added | Color of chlorinated product | Percent chlorine in product | Abs. vis. of 20% sol. in toluene | Stability at 125° C. for 24 hrs. | |
|---|---|---|---|---|---|---|---|
| | | | | | | Percent HCl | Color |
| 80,000 m. w. (metal free). | None | | White | 61.5 | 1.14 | 0.237 | L. tan. |
| Commercial | None | | Brown | 65.0 | | 0.77 | D. brown. |
| Do | Amino acetic acid | 0.5 | White | 66.4 | 1.08 | 0.81 | White. |
| Do | Di-amyl amine | 0.5 | Yellow | 37.2 | 1.65 | 0.59 | Brown. |
| Do | Acetic acid | 0.5 | White | 66.1 | 1.06 | 0.25 | L. tan. |

These results show in detail the beneficial effect of these protective substances against the presence of traces of metallic impurities when added to the chlorination mixture, and show the valuable protective effect both to the heat stability and to the color stability of the chlorinated product.

The exact method of operation of the discoloration preventing substances is as yet unknown but it is believed that the chlorine combines with the traces of metals present to produce metal chlorides, which may be the cause of the breakdown and discoloration, and that the preventor or stabilizer substances function by forming some type of compound with the traces of iron, aluminum and zinc salts, perhaps a double salt, which compounds are either insoluble in solvent or are removed from the sphere of chlorination by some other chemical factors.

Similar results may be obtained by a wide range of other substances, the above-mentioned substances being typical of the list, other typical substances being: organic acids, e. g., acetic, propionic, butyric, or oxalic, etc.; amino acids such as amino acetic, amino propionic, amino butyric acids, etc.; amines such as amyl amine, diamyl amine, butyl amines, propylamine, etc.; diethanol amine, methyl aniline, etc.; and the chlor substituted organic acids such as the chlor acetic acids, chlor propionic acids, etc.

The preferred embodiment of the process of the invention includes a chlorination reaction in the dark under controlled conditions of temperature and pressure. This is not, however, the only possible method of practicing the invention, since similar results are obtainable by chlorination of the polymer solution containing the discoloration-preventing substances in a field of ultra-violet light such as direct sunlight or light high in ultra-violet such as that derived from the mercury arc or from the iron arc. This procedure, however, is less satisfactory, since it yields a less uniform product.

The lower uniformity appears to be due to poor mixing of the rather viscous solutions by the chlorine bubbles, and irregularities in chlorine concentration in the solution.

The present invention is above described as particularly applicable to polyisobutylene and the chlorination processes and products. It is not, however, limited to polyisobutylene, but is similarly applicable to polypropylene, substantially without change, and it is equally applicable to the polyamylenes and to the modified polyisobutylenes produced from mixtures of isobutylene with the diolefins, as well as to the diolefinic polymers.

By the process of the invention there is produced a white, thermally resistant, thermoplastic chlorinated olefinic polymer having any desired percentage of chlorine therein, by a process of chlorination under controlled temperature and pressure in the presence of discoloration-preventing substances.

While there are above disclosed but a limited number of the embodiments of the invention, it is possible to produce still other embodiments without departing from the inventive concepts herein disclosed, and it is therefore desired that only such limitations be imposed on the appended claims as are stated therein or required by the prior art.

The invention claimed is:

1. The process of chlorination comprising the steps of dissolving a high molecular weight, substantially saturated, linear chain olefinic polymer in a chlorine-resistant solvent, adding thereto a discoloration-preventing substance comprising an organic acid, and thereafter treating the solution with elemental chlorine.

2. The process of chlorination comprising the steps of dissolving a high molecular weight, substantially saturated, linear chain olefinic polymer in a chlorine-resistant solvent, adding thereto a discoloration-preventing substance comprising an amino acid, and thereafter treating the solution with elemental chlorine.

3. The process of chlorination comprising the steps of dissolving a high molecular weight, substantially saturated, linear chain olefinic polymer in a chlorine-resistant solvent, adding thereto a discoloration-preventing substance comprising a chlor substituted organic acid, and thereafter treating the solution with elemental chlorine.

4. The process of chlorination comprising the steps of dissolving polyisobutylene in carbon tetrachloride, adding thereto a discoloration-preventing stabilizer substance comprising an organic acid, and thereafter treating the solution with elemental chlorine.

5. The process of chlorination comprising the steps of dissolving polyisobutylene in carbon tetrachloride, adding thereto a discoloration-preventing stabilizer substance comprising an amino acid, and thereafter treating the solution with elemental chlorine.

6. The process of chlorination comprising the steps of dissolving polyisobutylene in carbon tetrachloride, adding thereto a discoloration-preventing stabilizer substance comprising a chlor substituted organic acid, and thereafter treating the solution with elemental chlorine.

7. A thermally resistant, white, thermoplastic, chlorinated olefinic polymer containing a discoloration-preventing substance comprising an organic acid.

8. A thermally resistant, white, thermoplastic, chlorinated olefinic polymer containing a discoloration-preventing substance comprising a chlor substituted organic acid.

PER K. FROLICH.
LEWIS A. BANNON.